(No Model.)
H. YOUNGER.
RAT TRAP.
No. 253,470. Patented Feb. 7, 1882.
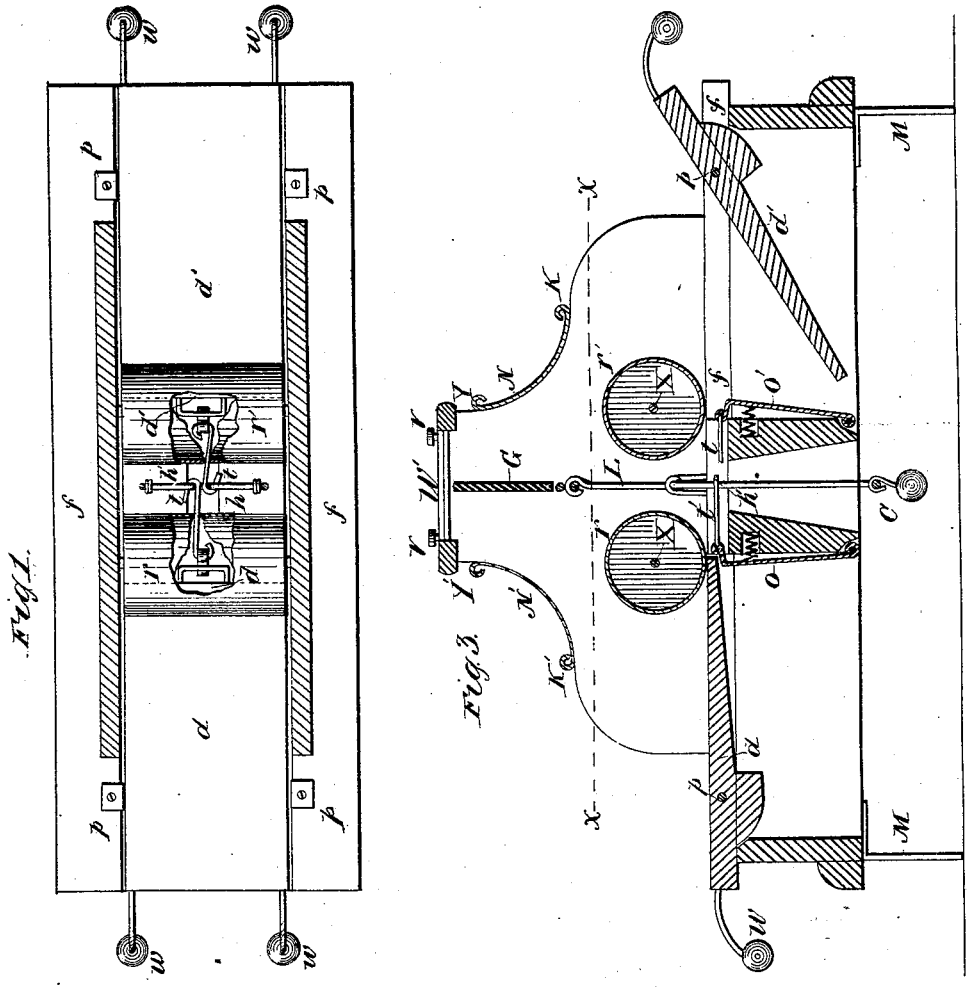
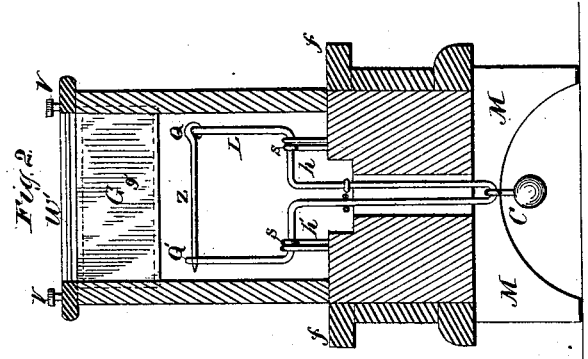
Witnesses:
Inventor:
Henry Younger

UNITED STATES PATENT OFFICE.

HENRY YOUNGER, OF AUSTIN, TEXAS.

RAT-TRAP.

SPECIFICATION forming part of Letters Patent No. 253,470, dated February 7, 1882.

Application filed March 26, 1881. (No model.)

*To all whom it may concern:*

Be it known that I, HENRY YOUNGER, of Austin, in the county of Travis, State of Texas, have invented a new and useful Improvement in Rat-Traps, which improvement is fully set forth in the following specification and accompanying drawings, in which—

Figure 1 is a plan view of the trap. Fig. 2 is a cross section of the trap. Fig. 3 is a longitudinal section of the same.

The object of my invention is to catch rats.

In the drawings, $f f$ is the frame. $d d'$ are trap-doors pivoted at $p\ p\ p\ p$, kept closed by weights W W W W. $r r'$ are cylinders revolving upon their centers $x$. L is a pendulum bait-frame vibrating on the standards S S, and held in a perpendicular position by the weight C. Z is the bait wire or rod, (upon which the bait is placed,) linked in bait-pendulum at Q, and passing through loop at Q'. $t t'$ are the triggers, attached to the cam-springs O O, and hooked around the pendulum-wires L at $h h'$. $g$ is a glass partition to prevent the passage of rats through the trap from one entrance to the other. The spaces from K to K' are the entrances to the trap over the trap-doors $d$ and $d'$. N and N' are coverings with spaces Y and Y' to admit light. W' is the top of trap, fastened by four thumb-screws, $v$, so that it can be taken off to bait the trap. M M are the legs of the trap.

The trap may be set over any box of sufficient size by inserting the legs M M into a hole cut in the top of box. The pendulum bait-frame L can be sprung apart to draw the bait-wire Z out of the loop at Q', and when the bait is strung on the wire Z the frame L is sprung and the bait-wire is placed in position. The rat enters the trap at either of the two entrances K to K', passes on, and places its front feet upon one of the rollers $r r'$, its hind feet resting upon one of the trap-doors $d d'$, when it pulls the bait on the wire Z, the pendulum bait-frame L swings on its pivots at S S, and the trigger $t$ or $t'$ pulls the cam-spring O or O from under the door $d$ or $d'$, and the weight of the rat causes the door to fall from under it. The rollers $r$ or $r'$ are then free to revolve and the rat falls into the box upon which the trap is set, and instantly the weights W and W bring the trap-door again into position with the trigger ready for another rat. The springing of one trap-door does not spring the other, though both are sprung by the same pendulum bait-frame L, but by separate triggers.

Having thus described my invention, what I claim as new, and desire to secure by Letters Patent, is—

The pendulum bait-frame L, in combination with triggers $t$ and $t'$, attached to cam-springs O and O, weighted trap-doors $d$ and $d'$, and rollers $r$ and $r'$, substantially as shown and described.

HENRY YOUNGER.

Witnesses:
 H. M. FULLER,
 F. M. MADDOX.